United States Patent [19]
Yang

[11] Patent Number: 5,720,079
[45] Date of Patent: Feb. 24, 1998

[54] PROPPING DEVICE FOR A CASTER OF A BABY WALKER

[76] Inventor: Chih-Huang Yang, No. 1-3, Lane 38, Jui-Feng St., Nan Dist., Taichung City, Taiwan

[21] Appl. No.: 805,955

[22] Filed: Feb. 24, 1997

[51] Int. Cl.⁶ .................................................. B60B 33/00
[52] U.S. Cl. ........................................................ 16/35 R
[58] Field of Search ............................ 16/35 R, 30, 32, 16/34, 43, 18 CG

[56] References Cited

U.S. PATENT DOCUMENTS

| | | | |
|---|---|---|---|
| 1,101,883 | 6/1914 | Rochford | 16/354 R |
| 2,689,355 | 9/1954 | Frank | 16/35 R |
| 2,812,041 | 11/1957 | Mugler | 16/35 R |

FOREIGN PATENT DOCUMENTS

| | | | |
|---|---|---|---|
| 2146277 | 3/1973 | Germany | 16/35 R |
| 44301 | 2/1989 | Japan | 16/18 B |
| 408334 | 9/1966 | Switzerland | 16/35 R |

*Primary Examiner*—Chuck Mah
*Attorney, Agent, or Firm*—Christensen, O'Connor, Johnson & Kindness PLLC

[57] ABSTRACT

A propping device includes a mounting seat mounted detachably on a baby walker, and a rotatable member mounted pivotally on the mounting seat and including a flat abutting plate portion positioned on the mounting seat above a lower end of the caster. A locking unit can lock automatically and releaseably the abutting plate portion on the mounting seat when the abutting plate portion is rotated relative to the mounting seat to a horizontal location under the caster. When the caster is lifted, the rotatable member can be rotated so as to turn the abutting plate portion to the horizontal position so as to abut the abutting plate portion on the ground, thus preventing rotation of the caster.

4 Claims, 6 Drawing Sheets

5,720,079

PROPPING DEVICE FOR A CASTER OF A BABY WALKER

BACKGROUND OF THE INVENTION

1. Field of the Invention

This invention relates to a caster propping device for a baby walker, more particularly to a propping device which is mounted to a bottom of a baby walker and which has a rotatable member that can be operated so as to rest on the ground and so as to space the caster from the ground, thus preventing the caster from moving.

2. Description of the Related Art

A baby walker is primarily a device for assisting a child during a stage when the child is learning to walk. Referring to FIG. 1, a conventional baby walker is shown to comprise an annular base frame 1, a number of casters 2 mounted on the base frame 1, a tubular frame 3 adjustably and foldably mounted on the base frame 1, a tray 4, and a seat portion 5. The casters 2 permit movement of the baby walker in any direction on the floor.

The baby walker is dangerous to use in a state of neglect. When the floor or ground is somewhat inclined, the baby walker may move thereon by virtue of gravity of the walker and the baby, or due to movement of the baby in the walker, thereby resulting in injuries to the baby. Thus, a device is required to inhibit movement of the casters of the baby walker when desired.

SUMMARY OF THE INVENTION

The main object of the present invention is to provide a caster propping device which has a simple construction suitable to be mounted on all kinds of baby walkers and which can prop a caster of a baby walker to inhibit the caster from moving.

According to this invention, a propping device includes a mounting seat which is adapted to be mounted detachably on the horizontal frame of a baby walker, and a rotatable member which is mounted pivotally on the mounting seat and which includes a flat abutting plate portion positioned on the mounting seat above a lower end of the caster. Upon lifting the caster from ground, the abutting plate portion is rotatable relative to the mounting seat to a horizontal location under the caster. A locking unit can lock automatically and releaseably the abutting plate portion on the mounting seat when the abutting plate portion is rotated to the horizontal location. When the caster is lifted, the rotatable member can be rotated so as to turn the abutting plate portion to the horizontal position so as to abut the abutting plate portion on the ground, thus preventing rotation of the caster.

BRIEF DESCRIPTION OF THE DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 1:
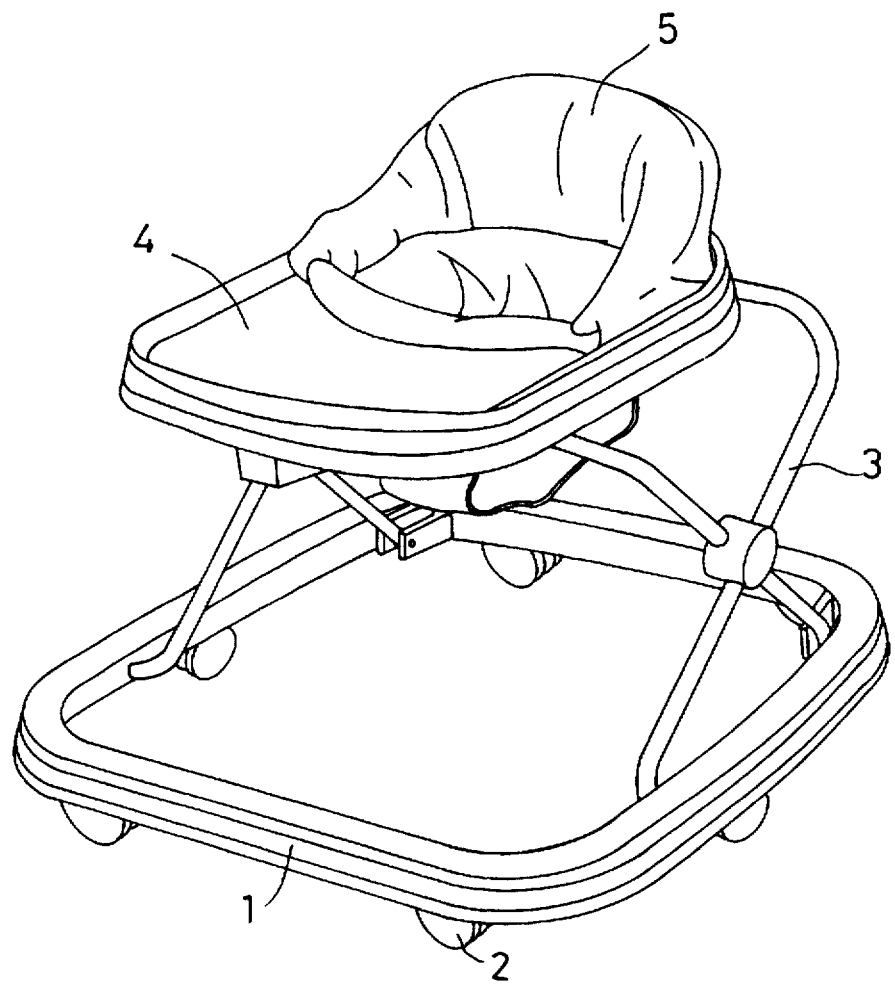
FIG. 1 is a perspective view of a conventional baby walker.
Figure 2:
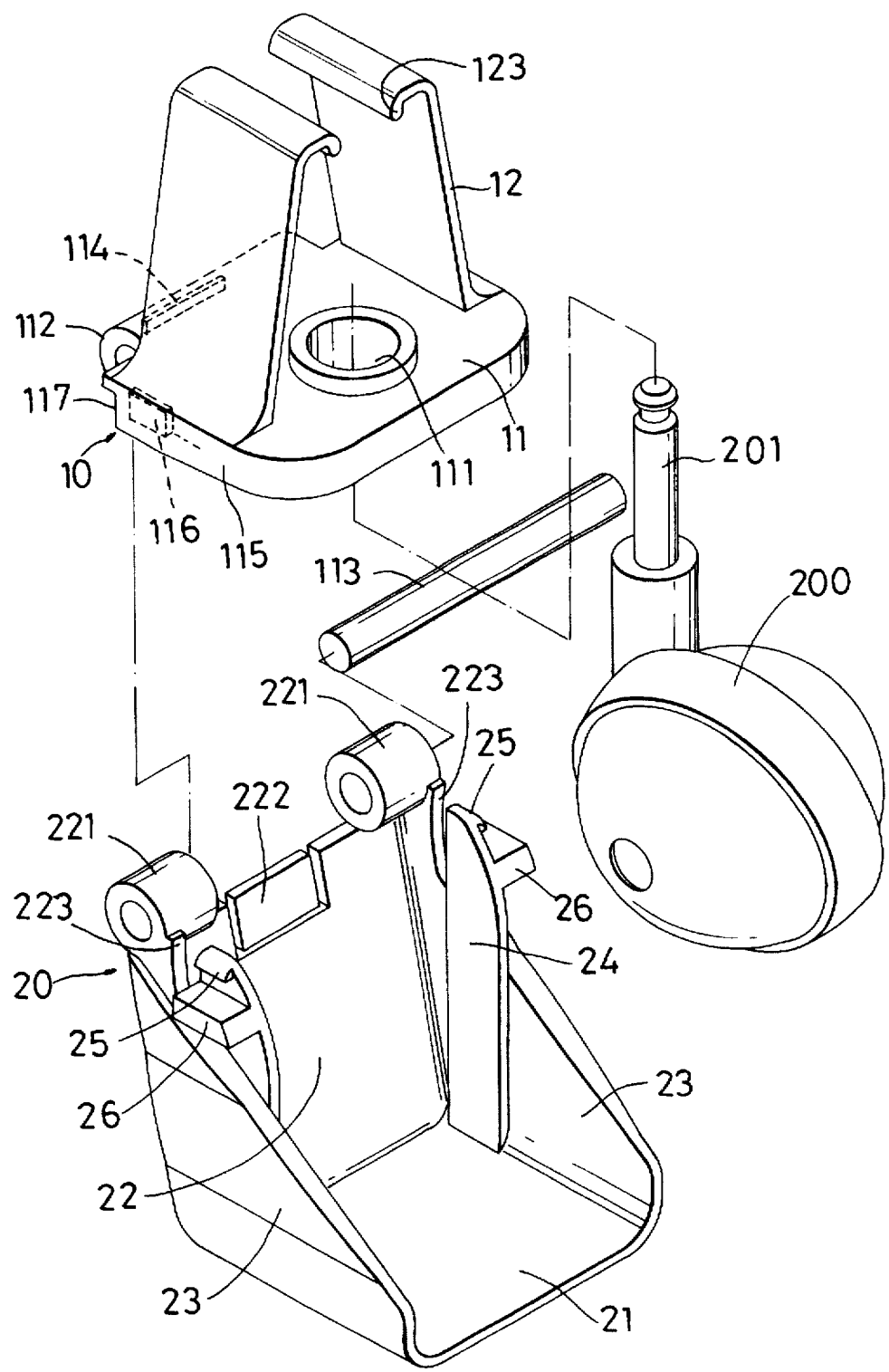
FIG. 2 is an exploded view of a preferred embodiment of a propping device according to the present invention, shown together with a caster of a baby walker.
Figure 3:
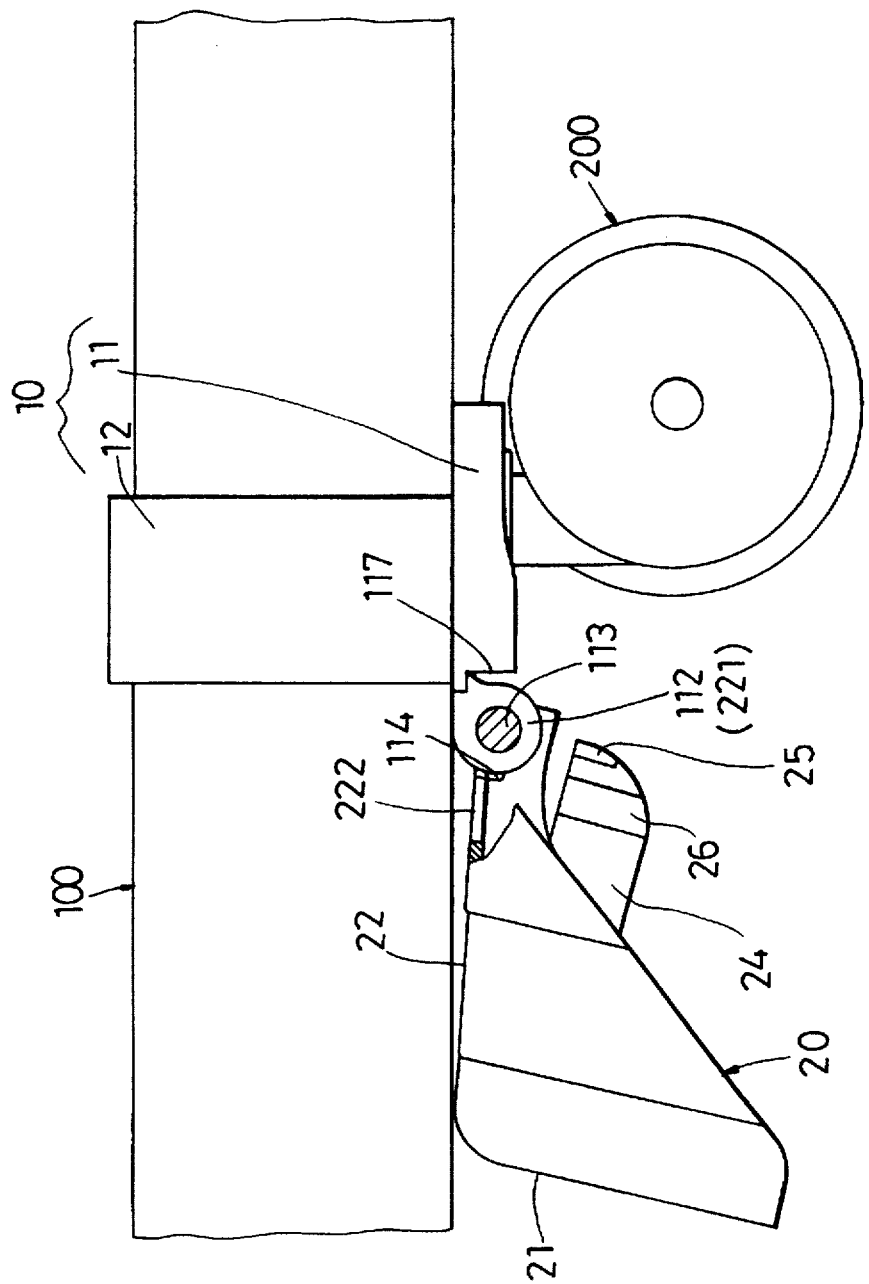
FIG. 3 is a schematic view of the propping device when mounted on the baby walker of the preferred embodiment.

Referring to FIGS. 2 and 3, the preferred embodiment of a propping device according to the present invention is shown to comprise a mounting seat 10 and a rotatable member 20, each of which is formed as a single plastic piece.

Figure 5:
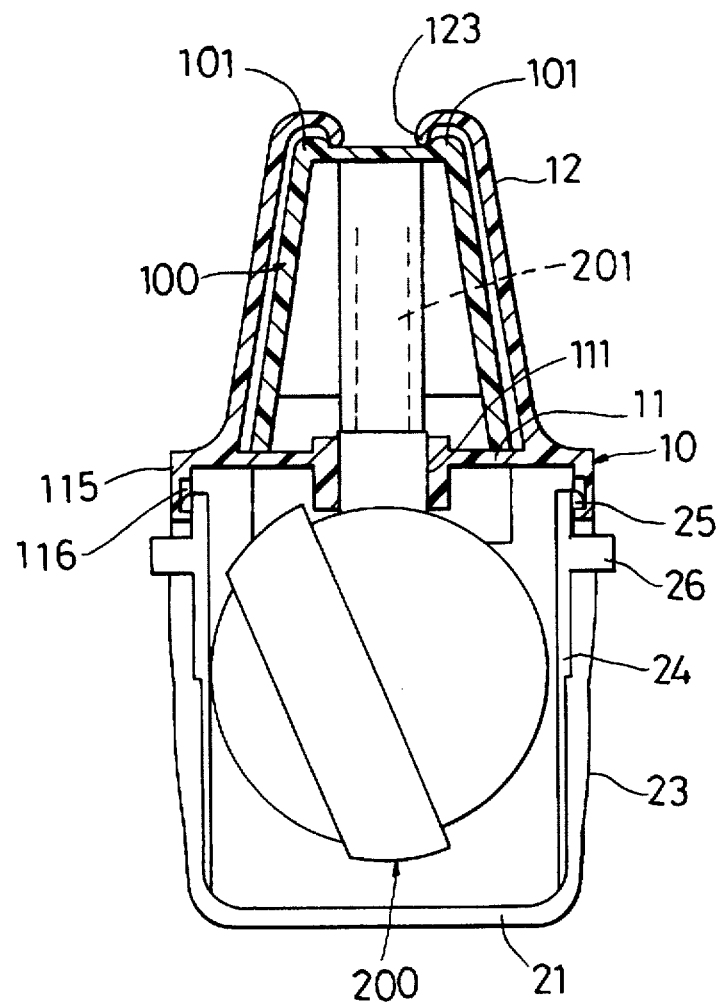
FIG. 5 illustrates how a rotatable member is locked on a mounting seat of the propping device.

The mounting seat 10 includes a horizontal base plate 11 which has a hole 111 that permits the shaft 201 of a caster 200 of a baby walker (not shown) to extend therethrough, and two inclined clamping sheets 12 which are integral with and which extend upwardly and inwardly from two opposite sides of the base plate 11 to clamp the horizontal base frame 100 of the baby walker therebetween in such a manner that the upper end hooks 123 of the clamping sheets 12 engage two side ribs 101 (see FIG. 5) of the frame 100. A middle sleeve 112 is integrally formed on the base plate 11. A support rib 114 projects integrally from the middle sleeve 112. A peripheral flange 115 projects downward from a peripheral portion of the base plate 11. The peripheral flange 115 has two opposed recesses 116 (only one is shown in FIG. 2) which are formed in the inward surface.

The rotatable member 20 includes a flat abutting plate 21 and a connecting plate 22 which is substantially perpendicular to the abutting plate 21. The connecting plate 22 has two integral side sleeves 221 which are located on two sides of the middle sleeve 112. A horizontal pivot pin 113 extends through the middle and side sleeves 112 and 221. A flexible positioning sheet 222 is integrally formed on the connecting plate 22 and rests on and above the support rib 114 so as to prevent the rotatable member 20 from turning downward about the pivot pin 113. The rotatable member 20 further has two opposed lateral plates 23 and two opposed strips 24. Each strip 24 extends integrally and perpendicularly from the abutting plate 21 and is adjacent to the corresponding lateral plate 23, and has a tapered tongue 25 which projects laterally and outwardly from the upper end of the strip 24. Two horizontal push sheets 26 are integrally and respectively formed on the strips 24 under the tongues 25. Each lateral plate 23 has an abutting surface 223 near the corresponding side sleeve 221.

In assembly, the pivot pin 113 extends through the middle and side sleeves 112 and 221 so that the rotatable member 20 can rotate about the pivot pin 113. The clamping sheets 12 are pulled outward to clamp the frame 100 therebetween. Then, the shaft 201 of the caster 200 is inserted through the hole 111 from the bottom of the base plate 11 to engage the base frame 100. The rotatable member 20 is turned upwardly to the position of FIG. 3 in which the connecting plate 22 is generally parallel to the base plate 11 and in which the position sheet 222 rests on support rib 114. In this situation, the caster 200 can rotate on the ground.

Figure 4:
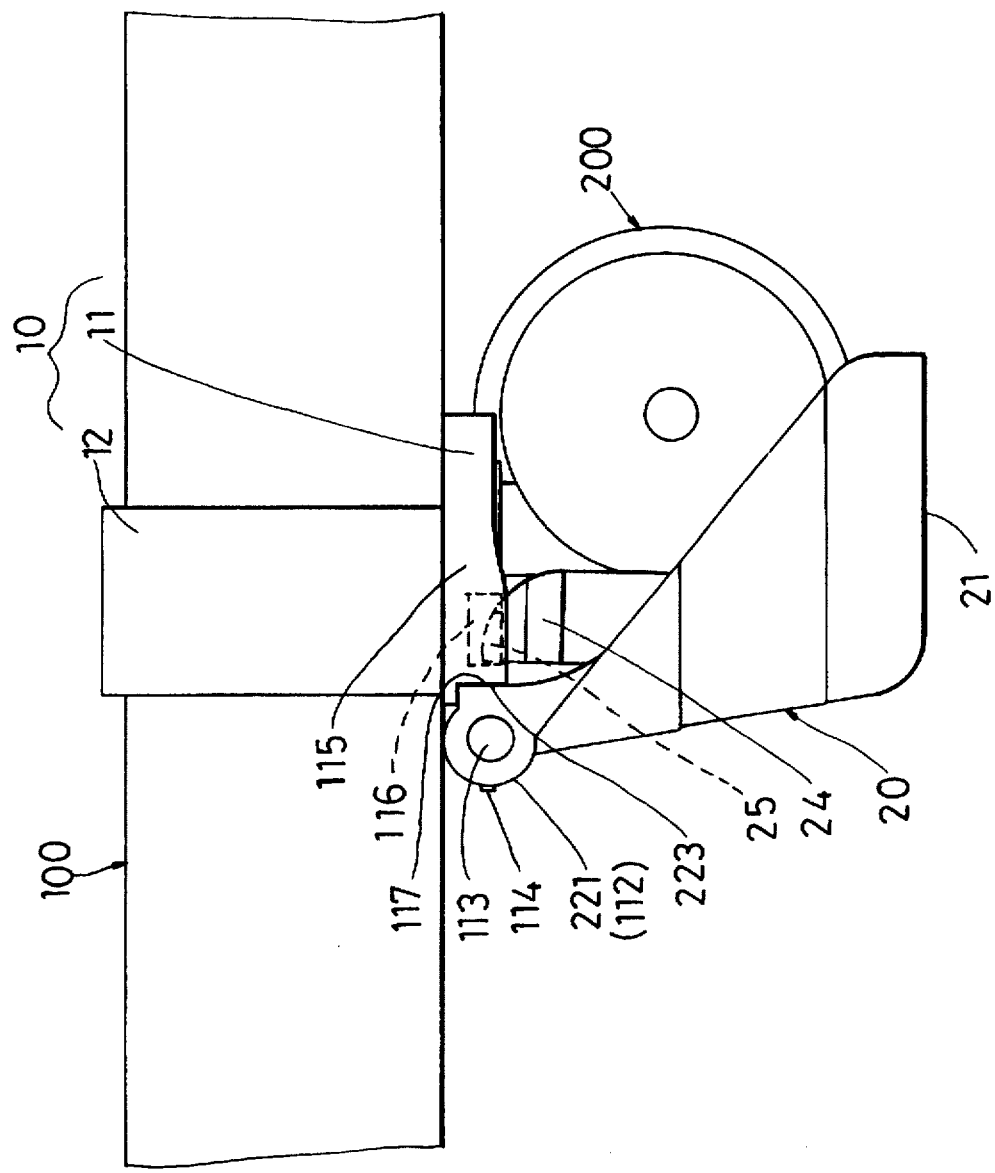
FIG. 4 is a schematic view illustrating how the propping device keeps the caster in position.

When it is desired to prevent the rotation of the caster 200, the frame 100 is lifted so as to separate the caster 200 from the ground. Then, the rotatable member 20 is rotated forcibly from the position of FIG. 3 to the position of FIGS. 4 and 5 in which the abutting surface 223 abuts against the vertical surface 117 of the mounting seat 10 and in which the abutting plate 21 of the rotatable member 20 is at a horizontal location. At this time, the rotatable member 20 is locked on the mounting seat 10 by virtue of engagement of the tongues 25 within the recesses 114. In this case, the frame 100 is put down so as to lie the abutting plate 21 of the rotatable member 20 on the ground. Accordingly, the caster 200 is located over the abutting plate 21 and cannot rotate on the ground.

Figure 6:
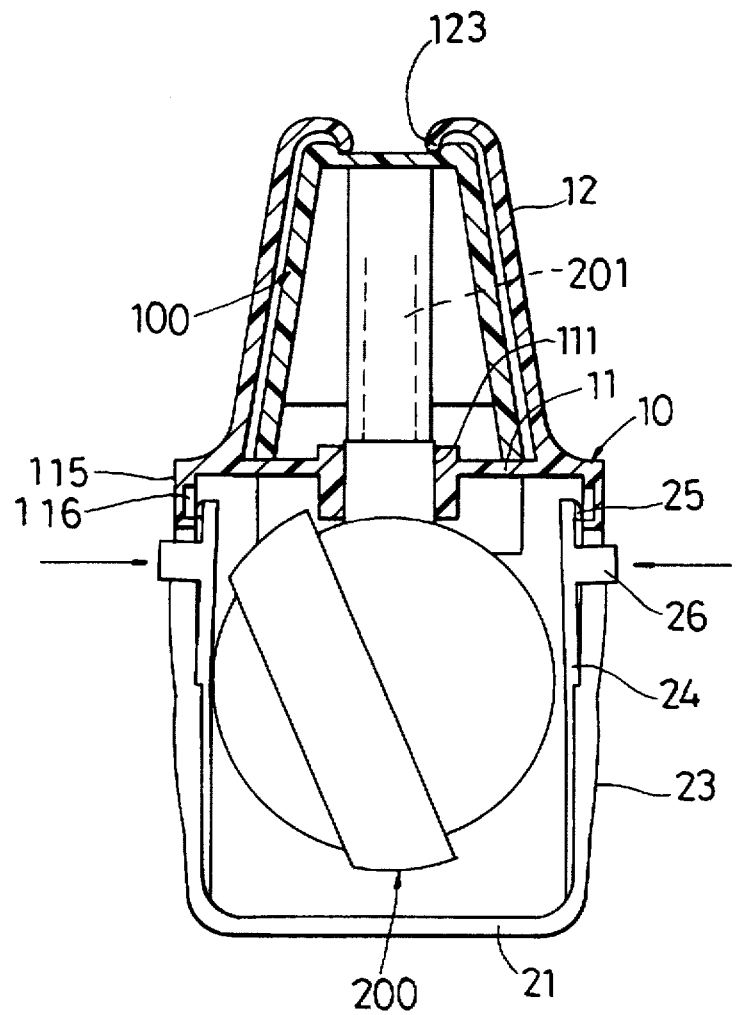
FIG. 6 illustrates how the rotatable member is unlocked from the mounting seat of the propping device.

To resume movement, referring to FIG. 6, the user pushes the push sheets 26 inwardly to disengage the tongues 251 from the recesses 116. Then, the rotatable member 20 can be turned upwardly to the position of FIG. 3 so as to be positioned on the mounting seat 10.

The propping device of the present invention can be easily operated to inhibit the movement of the caster 200 of the baby walker. In addition, the propping device is suitable for all kinds of conventional baby walkers.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A propping device for a caster of a baby walker, the caster having a vertical shaft, the walker having a horizontal frame on which the shaft of the caster is mounted, said propping device comprising:

a mounting seat adapted to be mounted detachably on the frame of the walker;

a rotatable member mounted pivotally on said mounting seat and including a flat abutting plate portion which is positioned on said mounting seat above a lower end of the caster and which, upon lifting of the caster from a ground surface, is rotatable relative to said mounting seat to a horizontal location under the caster; and a locking unit for automatically and releaseably locking said abutting plate portion of said rotatable member on said mounting seat when said abutting plate portion is rotated to the horizontal location;

whereby, when said caster is lifted, said rotatable member can be rotated so as to turn said abutting plate portion to the horizontal position after which said rotatable member can be placed on the ground surface so as to abut said abutting plate portion on the ground surface, thus preventing rotation of the caster.

2. A propping device as claimed in claim 1, wherein said mounting seat includes:

a horizontal base plate having a hole which is adapted to permit the shaft of the caster to extend therethrough; and two inclined clamping sheets integral with and extending upwardly and inwardly from two opposite sides of said base plate and adapted to clamp the frame of the walker therebetween.

3. A propping device as claimed in claim 2, wherein each of said mounting seat and said rotatable member is a single piece which is made of plastic, said mounting seat having a middle sleeve integrally formed on said base plate and a support rib projecting integrally from said middle sleeve, said rotatable member having two side sleeves located on two sides of said middle sleeve of said mounting seat, a connecting plate portion being located between and interconnecting said abutting plate portion, and a positioning sheet integrally formed on said connecting plate portion and resting on and above said support rib of said mounting seat, said propping device further including a horizontal pivot pin which extends through said middle and side sleeves so that said rotatable member can rotate about said pivot pin, whereby, said positioning sheet is supported on said support rib so as to prevent said rotatable member from turning downward about said pivot pin.

4. A propping device as claimed in claim 3, wherein said locking unit includes a peripheral flange which projects downward from a peripheral portion of said mounting seat and which has two opposed recesses formed in an inward surface of said flange, and two opposed strips, each of which extends integrally and perpendicularly from said abutting plate portion, and each of which has a tongue projecting laterally and outwardly from an upper end of said strip and a horizontal push sheet that is integrally formed on said strip under said tongue, said tongues being positioned relative to said abutting plate portion so as to engage said recesses of said mounting seat when said abutting plate portion is rotated to the horizontal position, said push sheets being pushable inwardly to disengage said tongues from said recesses in a case where said tongues engage said recesses.

* * * * *